United States Patent
Hövekamp et al.

(10) Patent No.: US 12,196,355 B2
(45) Date of Patent: Jan. 14, 2025

(54) WATER DRAINAGE ARRANGEMENT FOR A VEHICLE

(71) Applicant: Audi AG, Ingolstadt (DE)

(72) Inventors: Tanja Hövekamp, Bietigheim-Bissingen (DE); Robert Seitz, Eichstätt (DE); Andreas Stöcklein, Kösching (DE)

(73) Assignee: AUDI AG, Ingolstadt (DE)

( * ) Notice: Subject to any disclaimer, the term of this patent is extended or adjusted under 35 U.S.C. 154(b) by 208 days.

(21) Appl. No.: 17/820,740

(22) Filed: Aug. 18, 2022

(65) Prior Publication Data

US 2023/0054946 A1    Feb. 23, 2023

(30) Foreign Application Priority Data

Aug. 19, 2021  (DE) ............... 10 2021 121 525.0

(51) Int. Cl.
*F16L 5/10* (2006.01)
*B60H 1/32* (2006.01)
*B62D 25/24* (2006.01)

(52) U.S. Cl.
CPC .............. *F16L 5/10* (2013.01); *B60H 1/3233* (2013.01); *B62D 25/24* (2013.01)

(58) Field of Classification Search
CPC .......... F16L 5/10; B60H 1/3233; B62D 25/24
See application file for complete search history.

(56) References Cited

U.S. PATENT DOCUMENTS 10,000,110 B2    6/2018  Jeong et al.
2018/0264915 A1*  9/2018  Jeong ................. B60H 1/3233

FOREIGN PATENT DOCUMENTS

| CN | 203743428 U | 7/2014 | |
|---|---|---|---|
| CN | 203743699 U | 7/2014 | |
| CN | 206037564 U | 3/2017 | |
| CN | 209295528 U | 8/2019 | |
| CN | 111824192 A | 10/2020 | |
| CN | 213300561 U | 5/2021 | |
| DE | 19816331 C1 | 9/1999 | |
| DE | 10151620 B4 * | 11/2005 | ........... B60H 1/3233 |

(Continued)

OTHER PUBLICATIONS

Office Action directed to related Chinese Patent Application No. CN202210990515 A, mailed Sep. 4, 2024, with attached English-language machine translation; 18 pages.

*Primary Examiner* — Kun Kai Ma
(74) *Attorney, Agent, or Firm* — Sterne, Kessler, Goldstein & Fox P.L.L.C.

(57) ABSTRACT

The present disclosure relates to a water drain arrangement for a body of a vehicle. The water drain arrangement includes a drain channel, a tubular feed-through device extending through a first opening of a first wall panel of the body and a second opening of a second wall panel of the body. The water drain arrangement includes a body shell-fixed sleeve extending through the first shell opening of the first wall panel and is coupled to the first wall panel in a fluid-tight manner. A first end of the feed-through device is inserted through a first end of the body shell-fixed sleeve and includes a drain extending through a second end of the feed-through device. A free end of the drain channel is held in a fluid-tight manner in a seat of the feed-through device, which is disposed at a second end of the feed-through device.

17 Claims, 2 Drawing Sheets

(56) References Cited

FOREIGN PATENT DOCUMENTS

| DE | 602004006134 T2 | * | 1/2008 | ........... B60H 1/3233 |
|----|-----|---|---------|----|
| DE | 102008063142 A1 | * | 8/2009 | ............. B62D 25/07 |
| DE | 102009009065 A1 | | 8/2010 | |
| DE | 102018106492 A1 | | 9/2019 | |
| DE | 102019207800 A1 | * | 12/2020 | |
| DE | 112014006214 T5 | | 2/2022 | |
| EP | 1645447 A1 | | 4/2006 | |
| FR | 2911815 A1 | | 8/2008 | |
| JP | S 59223515 A | | 12/1984 | |
| KR | 20000034211 A | | 6/2000 | |
| KR | 200358233 Y1 | * | 8/2004 | |
| WO | WO 2008/099120 A1 | | 8/2008 | |

* cited by examiner

WATER DRAINAGE ARRANGEMENT FOR A VEHICLE

TECHNICAL FIELD

The invention relates to a water drain arrangement for a vehicle, in particular for condensate from a vehicle aggregate.

BACKGROUND

Water drain arrangements for vehicles, in particular for condensate from a vehicle aggregate, such as an air conditioning system, are known in numerous variations. Air conditioning systems are used in vehicles to control the temperature of a vehicle interior. In this case, the air conditioning system causes an air flow fed into the vehicle interior to be heated or cooled or kept at a current temperature on the basis of the respective requirements. In addition, moisture is extracted from the supplied air flow. In order to remove the resulting separated water or the condensate forming in the air conditioning system, water drain arrangements are generally used, which preferably have a drain channel that drains the water out of the vehicle through an opening in the body shell, preferably in the region of a vehicle floor.

An air conditioning system for a motor vehicle is known from DE 10 2009 009 065 A1, in which a multiplicity of functional units are arranged in an air flow path. The functional units are at least partially surrounded by respective housings, wherein the multiplicity of functional units comprises at least one fan, one filter, and one evaporator. At least a first housing is provided with a connecting element for draining condensate and for directly connecting the first housing to a second housing via the connecting element in a sealing manner.

For example, in DE 11 2014 006 214 T5, a prior art air conditioning system for motor vehicles includes an air conditioner case having a drainage port, an evaporator installed within the air conditioner case, and a drainage hose configured to discharge condensate water generated in the evaporator to the outside of a vehicle room. The drainage hose is connected to the drainage port and drawn out to the outside of the vehicle room through a dashboard. In addition, a connector means is configured to rotatably connect the drainage hose to the drainage port of the air conditioner case so as to permit rotation of the drainage hose with respect to the drainage port when the drainage hose is twisted in an assembling process of the drainage hose.

In another example in DE 10 2019 207 800 A1, a prior art condensate drain device for draining condensate in an electric vehicle comprises a tubular drain channel with an evaporator housing connection arranged at the inlet and a drain connector arranged at the outlet. The evaporator housing connection and a filter cover connection open into the drain channel. When in the installed state, the evaporator housing connection and the filter cover connection are arranged above the drain connector.

A prior art soundproofing system is shown in FR 2 911 815 A1, which is provided for evacuating condensates from a motor vehicle air conditioning system. A condensate drain of an air conditioning system is substantially a drain pipe that connects the hollow body of the housing of the air conditioning system to the outside and allows for evacuating vapors, mainly water vapors, initially contained in the air and then condensed on the evaporator. The soundproofing system comprises walls that form a labyrinth, so that, in a relatively compact space, a relatively long path is formed for sound waves penetrating from the outside through a condensate outlet. The walls are covered by a cover, the inside of which is coated with a hydrophobic, sound-absorbing material.

From CN 111824192 A, a prior art direct exhaust and drainage structure of a rail vehicle comprises a vehicle body frame, side walls, a passenger compartment floor, and a metal pipe. The pipe is provided with an upper part, a labyrinth portion, and a lower part. The upper part is arranged between the vehicle body frame and the side wall. The lower part penetrates through a floor frame of the vehicle body frame and extends to a position below the vehicle body. The labyrinth portion is arranged between the passenger compartment floor and the floor frame of the vehicle body frame. In addition, the pipe is encased by a thermal insulation material.

SUMMARY OF INVENTION

The problem addressed by the invention is providing a water drain arrangement for a vehicle that allows water to be separated simply through a hollow profile.

This problem is solved by a water drain arrangement for a vehicle having the features of the claimed embodiments. Advantageous embodiments of the invention with additional developments are specified in the dependent claims.

In order to provide a water drain arrangement for a vehicle, which allows for water to be separated simply through a hollow profile, the water drain arrangement for a vehicle comprises a drain channel, a tubular feed-through device which is guided through two body shell openings, introduced into opposite wall panels, of a hollow profile of a vehicle body, and a body shell-fixed sleeve which penetrates a first of the two body shell openings of the hollow profile and is connected to the hollow profile in a fluid-tight manner. In this case, the feed-through device is inserted in a fluid-tight manner into the body shell-fixed sleeve and penetrates said sleeve with a drain arranged at an inserted end of the feed-through device. The free end of the drain channel is inserted and held in a fluid-tight manner in a seat of the feed-through device, which is arranged at an end of the feed-through device opposite the drain. In this case, a continuous first sealing collar is formed on an outer wall of the body shell-fixed sleeve, which collar is connected to a corresponding first wall panel of the hollow profile and acts as a cover disk covering the first body shell opening in the first wall panel in a sealing manner. The body shell-fixed sleeve can preferably be designed as a metal sleeve. The first sealing collar, for example, can be welded or glued to the first wall panel. In addition, a continuous second sealing collar is formed on an outer wall of the seat of the feed-through device, which collar rests on a corresponding second wall panel of the hollow profile and acts as a cover disk covering a second body shell opening in the second wall panel of the hollow profile in a sealing manner. By closing the body shell opening by means of the second sealing collar, acoustic sealing of the hollow profile can be achieved In embodiments of the water drain arrangement for a vehicle according to the invention, separated water or condensate is guided through the hollow profile by means of the feed-through device without being able to penetrate into the hollow profile. In addition, embodiments of the water drain arrangement for a vehicle according to the invention also seal the vehicle from below against water which could penetrate through the drain of the feed-through device when driving through water. The feed-through device can preferably be made of an ethylene propylene diene monomer rubber (EPDM rubber). The hollow profile can be a cross member, for example, which is arranged in the floor region of the vehicle.

A sealing element can preferably be arranged between the first sealing collar and the first wall panel. The sealing element can be designed, for example, as a rubber sealing disk or as a rubber coating. Since the preferred mounting direction of the water drain arrangement is from above, the first wall panel of the hollow profile preferably corresponds to a lower wall panel which forms an outer border of the vehicle. The feed-through device can then be inserted into the body shell-fixed sleeve in one work step from above through a second body shell opening in a second upper wall panel which faces the vehicle interior.

In a further advantageous embodiment of the water drain arrangement, at least one anti-retraction device can be formed on an outer wall of the drain, which, in the mounted state, rests on the first sealing collar of the body shell-fixed sleeve. For this purpose, the at least one anti-retraction device can be designed, for example, as an elastic latching lug. Two latching lugs are preferably arranged opposite one another on the outer wall of the drain. In order to maintain elasticity when inserting the feed-through device into the body shell-fixed sleeve, elongated recesses can be introduced into the drain between the latching lugs.

In a further advantageous embodiment of the water drain arrangement, a first seal, which can interact with the body shell-fixed sleeve in a sealing manner, can be arranged on the feed-through device between the seat and the drain. The first seal can have at least one rubber-elastic sealing lip which can preferably be injection-molded onto the outer wall of the feed-through device and bear against an inner wall of the body shell-fixed sleeve in a sealing manner. In order to increase the sealing effect, the first seal can preferably have a plurality of rubber-elastic sealing lips.

In a further advantageous embodiment of the water drain arrangement, an insertion funnel can be formed at the free end of the seat of the feed-through device. This can facilitate the insertion and centering of the drain channel into the seat of the feed-through device. In addition, a stop, which predetermines the insertion depth of the drain channel, can be formed on an inner wall of the seat of the feed-through device. When inserting the drain channel into the seat of the feed-through device, a worker receives haptic feedback through the stop when the predetermined insertion depth for the drain channel has been reached. The stop can be implemented, for example, in that a through-opening of the feed-through device can be designed in a stepped manner with different diameters. For example, the seat and the drain of the feed-through device can each have a larger inner diameter than an intermediate piece between the seat and the drain.

In a further advantageous embodiment of the water drain arrangement, a second seal, which can interact in a sealing manner with the seat of the feed-through device, can be arranged at the free end of the drain channel. The second seal can have at least one rubber-elastic sealing lip which can preferably be injection-molded onto the outer wall of the drain channel and bear against the inner wall of the seat of the feed-through device in a sealing manner. In order to increase the sealing effect, the second seal can preferably have a plurality of rubber-elastic sealing lips.

The features and combinations of features mentioned above in the description, as well as the features and combinations of features mentioned below in the description of the figures and/or shown only in the figures, can be used not only in the respectively specified combination but also in other combinations or in isolation without departing from the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

One embodiment of the invention is shown in the drawings and explained in more detail in the following description. In the drawings, the same reference signs denote components or elements that carry out the same or analogous functions. In the drawings.

DETAILED DESCRIPTION OF THE FIGURES

Figure 1:
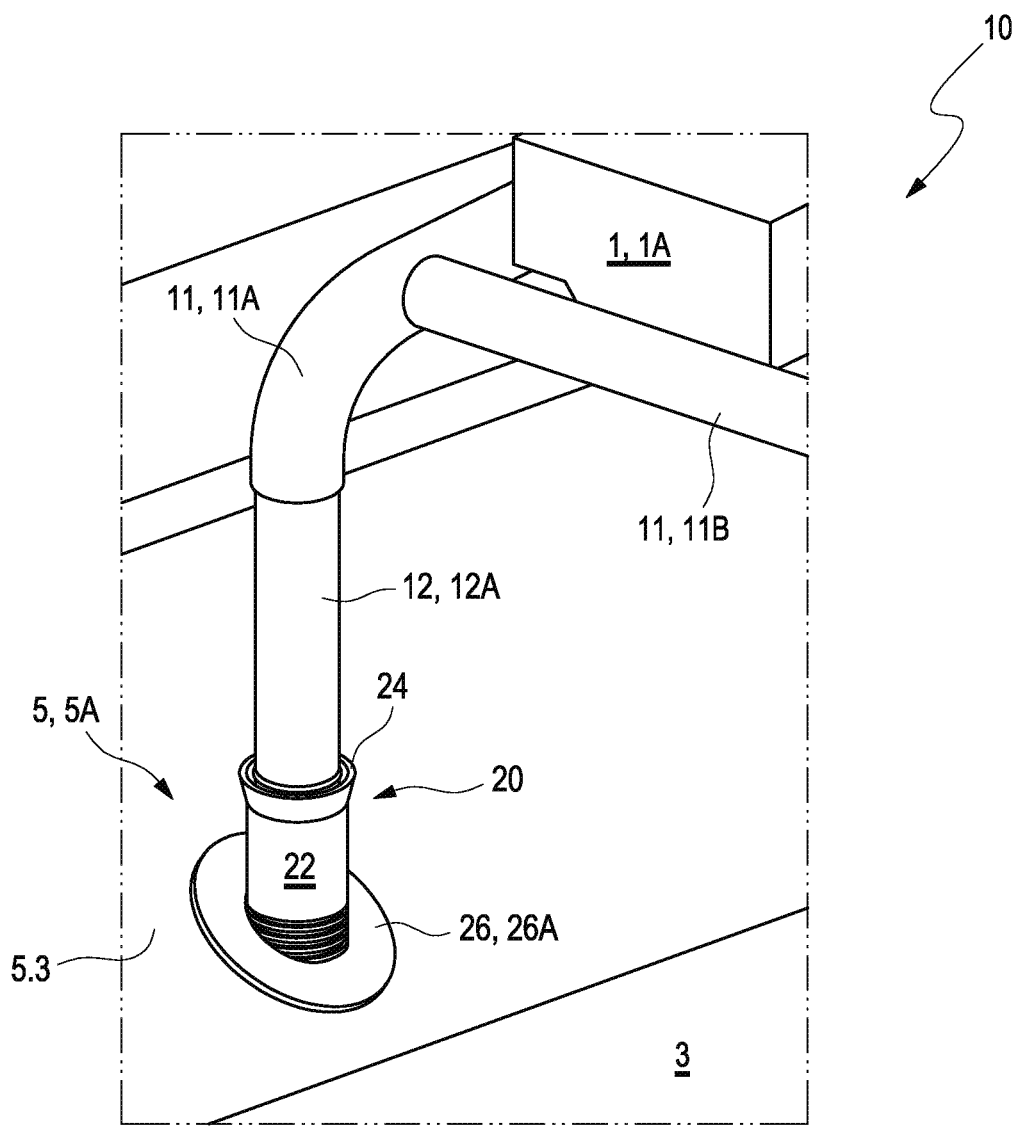
FIG. 1 is a schematic and perspective view of a section of a vehicle floor with an embodiment of a water drain arrangement according to an embodiment of the invention for a vehicle.
Figure 2:
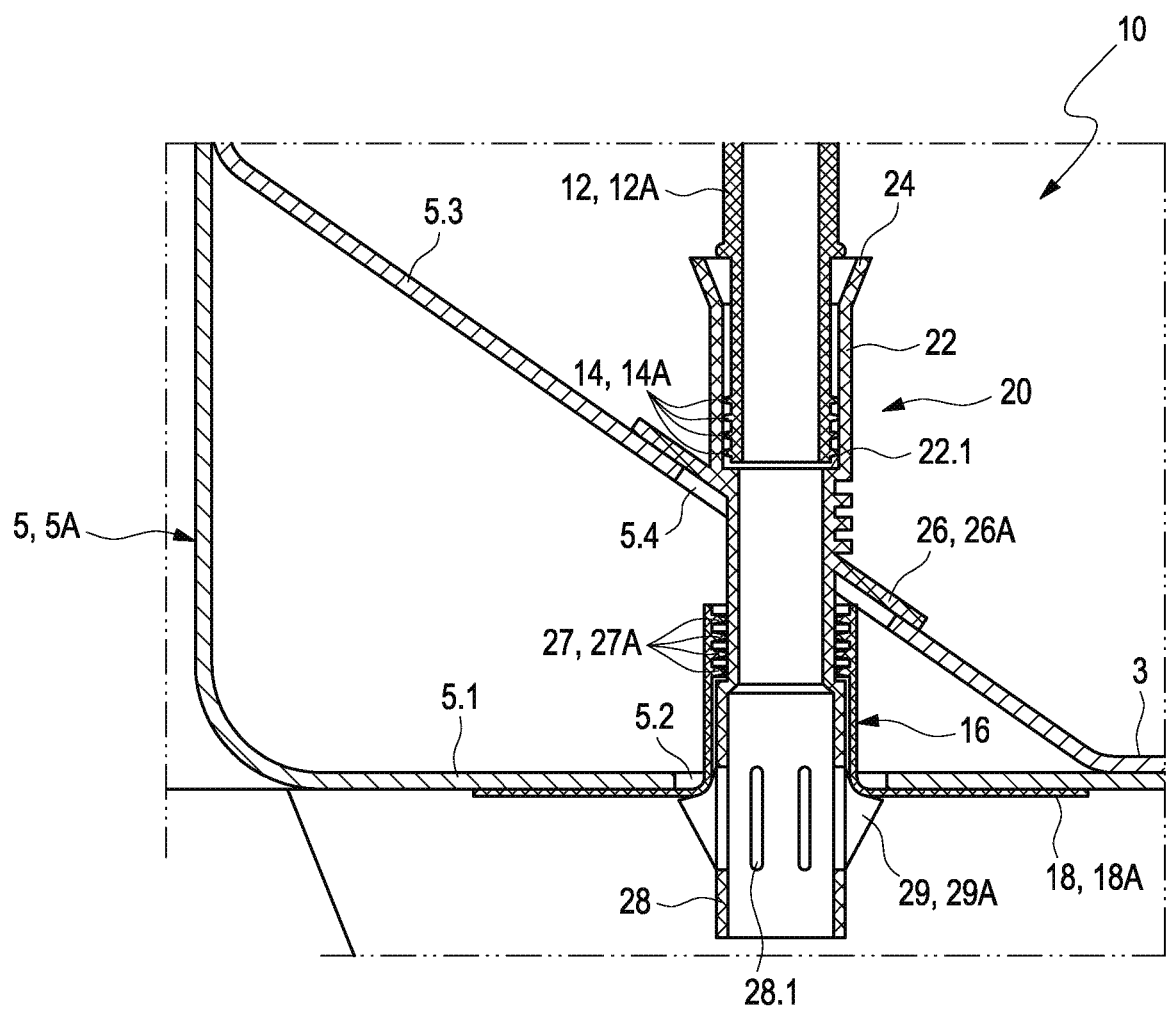
FIG. 2 is a schematic sectional view of the water drain arrangement for a vehicle according to an embodiment of the invention shown in FIG. 1.

As can be seen from FIGS. 1 and 2, a water drain arrangement 10 according to an embodiment of the invention comprises a drain channel 12, a tubular feed-through device 20 guided through two body shell openings 5.2, 5.4, introduced into opposite wall panels 5.1, 5.3, of a hollow profile 5 of a vehicle body, and a body shell-fixed sleeve 16 which penetrates a first of the two body shell openings 5.2, 5.4 of the hollow profile 5 and is connected to the hollow profile 5 in a fluid-tight manner. In this case, the feed-through device 20 is inserted in a fluid-tight manner into the body shell-fixed sleeve 16 and penetrates it with a drain 28 arranged at an inserted end of the feed-through device 20. The free end of the drain channel 12 is inserted into and held in a fluid-tight manner in a seat 22 of the feed-through device 20, which is arranged at an end of the feed-through device 20 opposite the drain 28.

In the embodiment shown, the water drain arrangement 10 is used to drain condensate from a vehicle aggregate 1 which in this case corresponds to an air conditioning system 1A. For this purpose, at least one inlet channel 11 is connected to the drain channel 12 in order to drain the condensate from the vehicle aggregate 1. As can also be seen from FIG. 1, two inlet channels 11A, 11B are brought together and connected to the drain channel 12 in the embodiment shown. The drain channel 12 is designed as a hose 12A in the embodiment shown.

As can also be seen from FIGS. 1 and 2, the hollow profile 5 shown corresponds to a cross member 5A arranged in the region of a vehicle floor 3. Therefore, a first wall panel 5.1 of the hollow profile 5 in the embodiment shown corresponds to a lower wall panel, which forms an outer border of the vehicle floor 3. This means that the body shell-fixed sleeve 16 is inserted into a first opening 5.2 of the first or lower wall panel 5.1 and connected to the hollow profile 5. The tubular feed-through device 20 is inserted from above through a second body shell opening 5.4 in a second wall panel 5.3, which in this case corresponds to an upper wall panel facing the vehicle interior, into the body shell-fixed sleeve 16 such that the feed-through device 20 completely bridges a hollow space in the hollow profile 5.

As can also be seen from FIG. 2, in the depicted embodiment of the water drain arrangement 10, a continuous first sealing collar 18 is formed on an outer wall of the body shell-fixed sleeve 16, which collar is connected to the corresponding first wall panel 5.1 of the hollow profile 5 and acts as a cover disk 18A covering the first body shell opening 5.2 in the first wall panel 5.1 in a sealing manner. In the embodiment shown, the first sealing collar 18 has an unspecified coating as a sealing element which bears against the first wall panel 5.1 of the hollow body 5 in a sealing manner. In the illustrated embodiment, the first sealing collar 18 is welded to the first wall panel 5.1 outside of the coating.

In an alternative embodiment (not shown), the first sealing collar 18 of the body shell-fixed sleeve 16 is glued to the first wall panel 5.1 of the hollow body 5. In this case, the adhesive layer acts simultaneously as a sealing element between the sealing collar 18 of the body shell-fixed sleeve 16 and the first wall panel 5.1 of the hollow body.

As can also be seen from FIG. 2, at least one anti-retraction device 29 is formed on an outer wall of the drain 28, which in the assembled state shown rests on the first sealing collar 18 of the body shell-fixed sleeve 16. In the embodiment shown, two anti-retraction devices 29 designed as elastic latching lugs 29A are arranged opposite one another on the outer wall of the drain 28. In order to maintain elasticity when inserting the feed-through device 20 into the body shell-fixed sleeve 16, elongated recesses 28.1 are introduced into the drain 28 between the latching lugs 29A. As a result, the latching lugs 29A can be pressed inwards when the drain 28 is inserted into the body shell-fixed sleeve 16. After passing through, the elastic latching lugs 29A return to their starting position and bear against the first sealing collar 18 of the body shell-fixed sleeve 16.

As can also be seen from FIG. 2, the tubular feed-through device 20 has different outer diameters and inner diameters. The outer diameters and the inner diameters of the tubular feed-through device 20 in the region of the seat 22 and in the region of the drain 28 are greater than at an intermediate piece of the feed-through device 20 between the seat 22 and the drain 28. This results in a stepped through-opening and a tapering in the region of the intermediate piece. In addition, a first seal 27, which interacts with the body shell-fixed sleeve 16 in a sealing manner, is arranged on the feed-through device 20 between the seat 22 and the drain 28. In the embodiment shown, the first seal 27 has four rubber-elastic sealing lips 27A which are injection-molded onto the feed-through device 20 and bear against an inner wall of the body shell-fixed sleeve 16 in a sealing manner.

As can also be seen from FIGS. 1 and 2, an insertion funnel 24 is formed at the free end of the seat 22 of the feed-through device 20. In addition, a stop 22.1, which predetermines the insertion depth of the drain channel 12, is formed on an inner wall of the seat 22 of the feed-through device 20. In the embodiment shown, the stop 22.1 is realized by the step in the through-opening of the feed-through device 20.

As can also be seen from FIGS. 1 and 2, a continuous second sealing collar 26 is formed on an outer wall of the seat 22 of the feed-through device 20, which collar rests on the corresponding second wall panel 5.3 of the hollow profile 5 and acts as a cover disk 26A covering the second body shell opening 5.4 in the second wall panel 5.3 of the hollow profile 5 in a sealing manner. Since the hollow profile 5 has a triangular cross section in the illustrated embodiment, the second sealing collar 26 is formed at a corresponding angle obliquely on the outer wall of the seat 22 of the feed-through device 20.

As can also be seen from FIG. 1, a second seal 14, which interacts with the seat 22 of the feed-through device 20 in a sealing manner, is arranged at the free end of the drain channel 12. In the embodiment shown, the second seal 14 has four rubber-elastic sealing lips 14A which are injection-molded onto the drain channel 20 and bear against the inner wall of the seat 22 in a sealing manner.

LIST OF REFERENCE SIGNS

1 Vehicle aggregate
1A Air conditioning system
3 Vehicle floor
5 Hollow profile
5A Cross member
5.1 First (lower) wall panel
5.2 First body shell opening
5.3 Second (upper) wall panel
5.4 Second body shell opening
10 Water drain arrangement
11, 11A, 11B Inlet channel
12 Drain channel
12A Hose
14 Second seal
14A Sealing lip
16 Body shell-fixed sleeve
18 First sealing collar
18A Cover disk
20 Feed-through device
22 Seat
22.1 Stop
24 Insertion funnel
26 Second sealing collar
26A Cover disk
27 First seal
27A Sealing lip
28 Drain
28.1 Recess
29 Anti-retraction device
29A Elastic latching lug

The invention claimed is:

1. A water drain arrangement for a body of a vehicle, comprising:
   a drain channel;
   a tubular-shaped feed-through device extending through a first body shell opening of a first wall panel of the body and a second body shell opening of a second wall panel of the body; and
   a body shell-fixed sleeve extending through the first body shell opening of the first wall panel of the body and coupled to the first wall panel of the body in a fluid-tight manner;
   a first seal disposed on an exterior surface of the tubular-shaped feed-through device, the first seal engaging an interior surface of the body shell-fixed sleeve to define a sealed interface between the interior surface of the body shell-fixed sleeve and the exterior surface of the tubular-shaped feed-through device,
   wherein a first end of the tubular-shaped feed-through device is received through a first end of the body shell-fixed sleeve, and the first end of the tubular-shaped feed-through device comprises a drain extending through a second end of the tubular-shaped feed-through device,
   wherein a second end of the tubular-shaped feed-through device comprises a seat receiving a free end of the drain channel, and the free end of the drain channel is held in a fluid-tight manner against the seat of the tubular-shaped feed-through device, wherein the body shell-fixed sleeve includes a first sealing collar connected to the first wall panel of the body of the vehicle and covers the first body shell opening to seal a connection between the first wall panel of the body and the body shell-fixed sleeve, and wherein the seat of the tubular-shaped feed-through device includes a second sealing collar engaging the second wall panel of the body of the vehicle and covers the second body shell opening of the second wall panel of the body in a sealing manner, wherein the first seal is disposed between the seat and the drain.

2. The water drain arrangement according to claim 1, further comprising:
a first sealing element arranged between the first sealing collar and the first wall panel.

3. The water drain arrangement according to claim 1, further comprising:
an anti-retraction device disposed on an outer wall of the drain, wherein an anti-rotation device is configured to be set in a mounted state such that the anti-retraction device engages the first sealing collar of the body shell-fixed sleeve.

4. The water drain arrangement according to claim 1, wherein an end of the seat of the tubular-shaped feed-through device comprises an insertion funnel.

5. The water drain arrangement according to claim 1, wherein an inner wall of the seat includes a stop defining an insertion depth of the drain channel received in the seat of the tubular-shaped feed-through device.

6. The water drain arrangement according to claim 1, further comprising:
a second seal disposed on an exterior surface of the free end of the drain channel, wherein the second seal engages an inner wall of the seat to define a sealed interface between the inner wall of the seat and the exterior surface of the free end of the drain channel.

7. The water drain arrangement according to claim 6, wherein the second seal comprises one or more rubber-elastic sealing lips.

8. The water drain arrangement according to claim 1, wherein the first seal comprises one or more rubber-elastic sealing lips.

9. A water drain arrangement for a body of a vehicle, comprising:
a drain channel;
a body shell-fixed sleeve extending through a first body shell opening of a first wall panel of the body of the vehicle and coupled to the first wall panel of the body of the vehicle in a fluid-tight manner, wherein the body shell-fixed sleeve includes a first sealing collar connected to the first wall panel of the body of the vehicle and covers the first body shell opening to seal a connection between the first wall panel of the body and the body shell-fixed sleeve,
a tubular-shaped feed-through device extending through a first body shell opening of a first wall panel of the body of the vehicle and a second body shell opening of a second wall panel of the body; wherein the tubular-shaped feed-through device comprises:
a first end received through a first end of the body shell-fixed sleeve, and the first end of the tubular-shaped feed-through device comprises a drain extending through a second end of the tubular-shaped feed-through device;
a second end comprising a seat receiving a free end of the drain channel, and the free end of the drain channel is held in a fluid-tight manner against the seat of the tubular-shaped feed-through device, wherein the seat of the tubular-shaped feed-through device includes a second sealing collar engaging the second wall panel of the body of the vehicle and covers the second body shell opening of the second wall panel of the body in a sealing manner
an anti-retraction device disposed on an outer wall of the drain, wherein the anti-retraction device is configured to be set in a mounted state such that the anti-retraction device engages the first sealing collar of the body shell-fixed sleeve.

10. The water drain arrangement according to claim 9, wherein the anti-retraction device comprises elastic latching lugs configured to be pressed inwards such that the elastic latching lugs are displaced into an interior of the drain.

11. The water drain arrangement according to claim 9, further comprising:
a first sealing element arranged between the first sealing collar and the first wall panel.

12. The water drain arrangement according to claim 9, further comprising:
a first seal disposed on the tubular-shaped feed-through device between the seat and the drain, wherein the first seal engages an interior surface of the body shell-fixed sleeve to define a sealed interface between the interior surface of the body shell-fixed sleeve and an exterior surface of the tubular-shaped feed-through device.

13. The water drain arrangement according to claim 9, wherein an end of the seat of the tubular-shaped feed-through device comprises an insertion funnel.

14. The water drain arrangement according to claim 9, wherein an inner wall of the seat includes a stop defining an insertion depth of the drain channel received in the seat of the tubular-shaped feed-through device.

15. The water drain arrangement according to claim 9, further comprising:
a second seal disposed on an exterior surface of the free end of the drain channel, wherein the second seal engages an inner wall of the seat to define a sealed interface between the inner wall of the seat and the exterior surface of the free end of the drain channel.

16. The water drain arrangement according to claim 15, wherein the second seal comprises one or more rubber-elastic sealing lips.

17. The water drain arrangement according to claim 12, wherein the first seal comprises one or more rubber-elastic sealing lips.

* * * * *